United States Patent [19]

Tsuge et al.

[11] Patent Number: 5,322,861
[45] Date of Patent: Jun. 21, 1994

[54] ULTRAVIOLET-HARDENING URETHANE ACRYLATE OLIGOMER

[75] Inventors: Yukio Tsuge, Ebina; Haruo Iizuka, Atsugi, both of Japan

[73] Assignee: Mitsubishi Kasei Corporation, Tokyo, Japan

[21] Appl. No.: 953,850

[22] Filed: Sep. 30, 1992

[30] Foreign Application Priority Data

Oct. 1, 1991 [JP] Japan ................................. 3-253740

[51] Int. Cl.$^5$ .................... C08F 2/48; C08G 18/18; C08G 18/72
[52] U.S. Cl. ...................................... 522/90; 522/174; 528/52; 528/53; 528/54; 528/57; 528/73; 528/84
[58] Field of Search ................. 522/90, 96, 97, 98, 522/174, 173; 528/52, 53, 54, 57, 73, 75, 84

[56] References Cited

U.S. PATENT DOCUMENTS 4,382,102  5/1983  Noomen ............................ 522/97
4,485,226  11/1984  Noll et al. ........................ 522/96

FOREIGN PATENT DOCUMENTS 54-22238  8/1979  Japan .
57-34853  7/1982  Japan .
1-161010  6/1989  Japan .
1-185314  7/1989  Japan .

*Primary Examiner*—Susan Berman
*Attorney, Agent, or Firm*—Oblon, Spivak, McClelland, Maier & Neustadt

[57] ABSTRACT

Disclosed is an urethane acrylate oligomer to be obtained by reacting an isocyanate group-having urethane prepolymer and hydroxyl group-having acrylate and/or methacrylate, in which the urethane prepolymer is one having isocyanurate rings and the hydroxyl group-having acrylate and/or methacrylate comprises 4-hydroxybutyl acrylate and/or 4-hydroxybutyl methacrylate. The oligomer has a much lower viscosity of itself and a much higher ultraviolet-hardening speed, than the conventional urethane acrylate oligomers, and may be hardened to give a film having excellent physical properties of flexibility, heat resistance, weather resistance of hot-cold repetition cycles and scratch resistance.

6 Claims, No Drawings

ULTRAVIOLET-HARDENING URETHANE ACRYLATE OLIGOMER

FIELD OF THE INVENTION

The present invention relates to an ultraviolet-hardening polyurethane resin. More precisely, it relates to an ultraviolet-hardening urethane acrylate oligomer, which has a low resin viscosity and has a rapid ultraviolet-hardening speed and which may be hardened to give a film having excellent film properties such as high heat resistance.

BACKGROUND OF THE INVENTION

An ultraviolet-hardening resin composition is composed of an acrylic oligomer, an acrylic monomer and a photo-polymerization initiator as essential components. The oligomer is a main factor of determining the physical properties of the hardened product from the composition and the liquid properties of the composition itself. As typical examples of the oligomer, there are mentioned urethane acrylates, epoxy acrylates and polyester acrylates.

In particular, urethane acrylates, which can be characterized in flexibility, toughness, weather resistance, chemical resistance and glass transition point by selecting the kinds and proportions of the components such as polyol component, polyisocyanate component and hydroxyl group-containing acrylic monomer, are used in various fields of woodworking materials, polyvinyl chloride flooring materials, coating agents for shaped plastic articles, and coating agents for optical fibers.

Coating agents themselves, containing such urethane acrylates, are described in JP-B 54-22238 and 57-34853. (The term "JP-B" as used herein means an "examined Japanese patent publication".) However, the hydroxyl group-containing acrylates as disclosed in them are only 2-hydroxyethyl acrylate and 2-hydroxypropyl acrylate, and only 2-hydroxyethyl acrylate is concretely used in the examples of them. The disclosed acrylates could not be incorporated into the coating agent in the absence of a solvent.

On the other hand, JP-A 1-161010 mentions a coating agent containing an urethane acrylate. (The term "JP-A" as used herein means an "unexamined published Japanese patent application".) However, it relates to an electron-hardening resin composition, which is different from the present invention relating to an ultraviolet-hardening resin. In addition, only 2-hydroxyethyl acrylate is used in the examples of JP-A 1-161010, and this indispensably needs an acrylic monomer as a reactive diluting agent.

JP-A 1-185313 relates to a photo-hardening resin, like the present invention, and the use of urethane acrylates is mentioned. However, only 2-hydroxyethyl acrylate is used in the examples of JP-A 1-185313, and it also needs a reactive diluting agent of an acrylic monomer or the like.

The conventional urethane acrylate oligomers as disclosed in the above-mentioned patent publications or applications have a high viscosity of themselves, as having many urethane bonds therein, and therefore need various diluting agents (such as acrylic monomers, solvents, etc.) when they are formed into coating agents or coating paints. Thus, they involve various problems with respect to the current needs of solvent-free products and energy saving products.

In addition, they are also not sufficiently satisfactory with respect to the ultraviolet-hardening speed and to the physical properties of the hardened films from them, such as flexibility, heat resistance and weather resistance of hot-cold repetition cycles.

SUMMARY OF THE INVENTION

The object of the present invention is to provide an urethane acrylate oligomer, which has a low viscosity of itself and has a high ultraviolet-hardening speed, which has an excellent film-forming capacity of hardly giving an uneven or streaky film in the absence of a diluting agent, and which may be hardened to give a film having excellent physical properties of flexibility, heat resistance, weather resistance of hot-cold repetition cycles and scratch resistance.

In consideration of the above-mentioned current situation, the present inventors variously investigated the related matters and have found that an urethane acrylate oligomer to be obtained by reacting an isocyanato group having urethane prepolymer and a hydroxyl group-having acrylate and/or methacrylate, in which the urethane prepolymer is one having isocyanurate rings and the hydroxyl group-having acrylate and/or methacrylate comprises 4-hydroxybutyl acrylate and/or 4-hydroxybutyl methacrylate, has a much lower viscosity itself and a much higher ultraviolet-hardening speed, than the conventional urethane acrylate oligomers, and may be hardened to give a film having excellent physical properties of flexibility, heat resistance, weather resistance of hot-cold repetition cycles and scratch resistance. On the basis of the finding, they have attained the object of the present invention.

DETAILED DESCRIPTION OF THE INVENTION

The present invention is explained in detail hereunder.

The urethane acrylate oligomer of the present invention is one to be obtained by reacting an isocyanate group-having urethane prepolymer and a hydroxyl group having (meth)acrylate, in which the urethane prepolymer is one having isocyanurate rings and the hydroxyl group-having (meth)acrylate comprises 4-hydroxybutyl (meth)acrylate. The oligomer has a low viscosity, for example, a viscosity of 600 poise or less.

The urethane acrylate oligomer of the present invention, preferebly has a number average molecular weight of from 500 to 10000, preferably from 800 to 8000. If it has a number average molecular weight of less than 500, the flexibility of the hardened film from it would be insufficient. If it has a number average molecular weight of more than 10000, the viscosity of the oligomer would be too high so that the oligomer would have a problem in forming it into a coating composition. The number average molecular weight of the present invention is obtained by GPC analysis thereof followed by referring to the molecular weight calibration curve of a standard polystyrene o the basis of the analyzed data.

It is preferred that the urethane acrylate oligomer has two or more (meth)acrylate groups in one molecule on average. If the number of the groups is less than 2, the hardened film from the oligomer would have poor physical properties of solvent resistance and scratch resistance.

The method of producing the urethane acrylate oligomer of the present invention may be suitably selected from known methods, in consideration of the kinds of the raw materials to be used. For instance, the raw materials are reacted, if desired, in the presence of a solvent or acrylic monomer which is generally inert to isocyanate group is optionally used and, if desired, in the presence of an ordinary urethanating catalyst, at a temperature within the range of from 10° to 100° C., preferably from 20° to 90° C.

The urethane prepolymer, which has isocyanate groups and isocyanurate rings, to be used in the present invention for producing the urethane acrylate oligomer is obtained by reacting a polyol and an excess organic di(poly)isocyanate or an urethane prepolymer having terminal isocyanate groups in the presence of a cyclizing trimerization catalyst, for example, tertiary amines such as N,N',N"-tris(dimethylaminoalkyl)hexahydrotriazine or 2,4,6-tris(dimethylaminomethyl)phenol, or carboxylic acid salts such as potassium acetate or lead 2-ethylhexanoate, or quaternary ammonium salts of organic acids, whereupon the reaction is stopped at the time when the content of the isocyanurate rings in the urethane prepolymer formed has reached the desired value.

For obtaining the urethane prepolymer having isocyanurate rings therein, the proportion of organic diisocyanate compound/polyol is desired to be within the range of from 5/0 to 5/1 (as equivalent ratio of NCO-/OH).

It is indispensable that the urethane prepolymer in the present invention is one having isocyanurate rings therein. If it has no isocyanurate ring therein, it could not yield the oligomer having a low viscosity as defined in the present invention.

As examples of the organic diisocyanate compound which is a raw material of producing the urethane prepolymer for use in the present invention, there are mentioned 2,4-tolylene diisocyanate, 2,6-tolylene diisocyanate, 1,3-xylylene diisocyanate, 1,4-xylylene diisocyanate, diphenylmethane-4,4'-diisocyanate, diphenylmethane-2,4'-diisocyanate, 3-methyldiphenylmethane diisocyanate, hexamethylene diisocyanate, isophorone diisocyanate, dicyclohexylmethane-4,4'-diisocyanate, dicyclohexylmethane-2,4'-diisocyanate, ω,ω'-diisocyanatodimethylcyclohexane and lysine diisocyanate.

Polyol compounds having at least two hydroxyl groups for use in the present invention are generally those having a molecular weight of from 50 to 2000. Usable as such polyol compounds are known ones which are generally used in production of polyurethane resins, including, for example, low molecular weight glycols, low molecular weight polyols, polyether polyols, polyester polyols, polybutadiene polyols, hydrogenated polybutadiene polyols, silicon-containing polyols, and phosphorus-containing polyols.

As low molecular weight glycols, for example, usable are ethylene glycol, diethylene glycol, triethylene glycol, propylene glycol, dipropylene glycol, 1,3-butanediol, 1,4-butanediol, pentaethylene glycol, hexamethylene glycol, neopentyl glycol, 2-ethyl-1,3-hexanediol, and bisphenol A.

As low molecular weight polyols, for example, usable are trimethylolpropane, glycerin pentaerythritol, erythritol, and sorbitol.

As polyether polyols, for example, usable are polymers or copolymers of ethylene oxide, propylene oxide or tetrahydrofuran. Also usable are polyethers to be formed by condensation of the above-mentioned low molecular weight glycols, mixed ethers, and addition-polymerized polymers to be formed by adding ethylene oxide or propylene oxide to these polyethers or low molecular weight glycols.

As polyester polyols, for example, usable are those to be formed by dehydrating condensation of low molecular weight glycols and dibasic acids, as well as lactone polyols to be formed by ring-cleaving polymerization of lactones, such as ε-caprolactone, in the presence of the above-mentioned low molecular weight glycols.

Next, the thus obtained urethane prepolymer having isocyanurate rings and isocyanato groups is reacted with 4-hydroxybutyl acrylate and/or 4-hydroxybutyl methacrylate in such a way that the ratio of the hydroxyl equivalent number to the isocyanate equivalent number may be 0.5 or more, at a temperature within the range of from 30° to 90° C.

The reaction is desirably effected in the presence of from 50 to 5000 ppm of a polymerization inhibitor, such as orthonitrotoluene, hydroquinone, hydroquinone monomethyl ether or copper chloride, so as to inhibit thermal polymerization of the acrylic groups of the reactants.

Use of 4-hydroxybutyl acrylate and/or 4-hydroxybutyl methacrylate as the hydroxyl group-containing acrylate and/or methacrylate is essential in the present invention. If the (meth)acrylate having a shorter or longer carbon chain than this is used, the oligomer having the characteristics of the present invention could not be obtained. So far as the specific (meth)acrylate is used, it may be combined with any other hydroxyl group-containing (meth)acrylate(s). In the case, it is necessary that the proportion of 4-hydroxybutyl acrylate and/or 4-hydroxybutyl methacrylate in the combined mixture is 30 mol % or more, preferably 35 mol % or more, especially preferably 40 mol % or more, of the whole of the hydroxyl group-containing monomer mixture.

If the proportion of 4-hydroxybutyl (meth)acrylate is less than 30 mol %, the effect of the present invention of giving an oligomer resin having a lowered viscosity and being able to be hardened to give a film having excellent physical properties could not be attained.

As other hydroxyl group-containing (meth)acrylates, usable are 2-hydroxyethyl acrylate, 2-hydroxypropyl acrylate, 2-hydroxypropyl methacrylate, 2-hydroxyethyl methacrylate, 4-hydroxycyclohexyl acrylate, caprolactone-modified hydroxyethyl acrylate, 5-hydroxycyclooctyl acrylate, 2-hydroxy-3-phenyloxypropyl acrylate, and pentaerythritol triacrylate.

Since the urethane acrylate oligomer of the present invention has a much lower viscosity of 600 poise or less (25° C.) than conventional urethane acrylate oligomers, it may be used in an ultraviolet-hardening coating composition or adhesive which is characterized in that the oligomer is hardened to form an excellent film in the absence of a solvent or a reactive diluting agent. If desired, however, a small amount of a reactive diluting agent or any other ultraviolet-hardening resins may be combined with the oligomer of the present invention, which does not interfere with the effect of the present invention.

As a reactive diluting agent, usable in the present invention are tetrahydrofurfuryl (meth)acrylate, 2-ethylhexyl (meth)acrylate, methoxyethyl (meth)acrylate, N-vinylpyrrolidone, phenyl (meth)acrylate, 2-hydroxyethyl (meth)acrylate, diethylene glycol di(meth)acrylate, tetraoxyethylene glycol di(meth)acrylate, trimethylolpropane tri(meth)acrylate, pentaerythritol hexa(meth) acrylate, trimethylolpropane di(meth-)acrylate, and pentaerythritol tetra(meth)acrylate.

As other ultraviolet-hardening resins, usable in the present invention are epoxyacrylate oligomers, polyester acrylate oligomers, and urethane acrylate oligomers.

The photo-polymerization initiator to be added to the ultraviolet-hardening urethane acrylate oligomer of the present invention is not specifically defined, which includes, for example, benzophenone, acetophenone, benzoin, benzoin isobutyl ether, benzoin isopropyl ether, benzoin ethyl ether, 4,4'-bisdimethylaminobenzophenone, 2-hydroxy-2-methyl-1-phenylpropan-1-one, benzyldimethyl ketal, 2-chlorothioxanthone, 2,4-dimethylthioxanthone, and 1-hydroxycyclohexyl phenyl ketone.

Where the oligomer of the present invention is formed into a spray-coating composition which is to have a low viscosity to be coated by spray-coating, it may be diluted with a solvent such as acetone, methyl ethyl ketone, methyl isobutyl ketone, dioxane-toluene, cyclohexanone, tetrahydrofuran, ethyl acetate, or butyl acetate.

To the urethane acrylate oligomer of the present invention or a composition containing the oligomer, may be added dyes, pigments or metal powder as a colorant.

Where the oligomer or the composition is used as a coating material, the bases to be coated therewith may be woods, metals, concretes, asbestos, papers or plastics.

As ray sources to be irradiated to the oligomer of the present invention so as to harden it, usable are, for example, low pressure mercury lamp, high pressure mercury lamp, ultra-high pressure mercury lamp, and metal halide lamp. It is also possible to harden the urethane acrylate oligomer of the present invention with electron beams.

The reason why the urethane acrylate oligomer of the present invention has a much lower viscosity and a much higher ultraviolet-hardening speed than conventional urethane acrylate oligomers and may be hardened to form a film having excellent physical properties is not clear but may be considered to be because the (meth)acrylic group in the 4-hydroxybutyl (meth)acrylate in the oligomer of the present invention is made more mobile than that in 2-hydroxyethyl (meth)acrylate or in 2-hydroxypropyl (meth)acrylate due to the longer distance between the hydroxyl group and the (meth)acrylate group by the carbon chain of one or two carbons so that the former 4-hydroxybutyl (meth)acrylate may be crosslinked more easily than the latter. If the distance between the hydroxyl group and the (meth)acrylate group in the acrylate is longer than this, the modulus of elasticity of the crosslinked film from the oligomer would be too low. In addition, in the case, the solubility and compatibility of the oligomer in and with other oligomers, diluting monomers and solvents would be poor.

Next, the present invention will be explained in more detail by way of the following working examples and experimental examples, which, however, are not intended to restrict the scope of the present invention.

RESIN PRODUCING EXAMPLE 1

444 g of isophorone diisocyanate, 650 g of polytetramethylene ether glycol (having number average molecular weight of 650) and 0.1 g of urethanating catalyst dibutyl tin dilaurate were put in a four-neck flask equipped with a thermometer, a stirrer, a dropping funnel and a drier-combined condenser and reacted for 2 hours with stirring at a reaction liquid temperature of 60° C. to obtain an isocyanurate ring-free urethane prepolymer. Subsequently, the reaction liquid temperature was lowered to 40° C., and 0.6 g of dibutyl tin dilaurate and 0.4 g of polymerization inhibitor hydroquinone monomethyl ether were added, and 2.4 mols of 4-hydroxybutyl acrylate (having molecular weight of 144) was dropwise added over a period of about 30 minutes to continue the reaction. Next, the reaction liquid temperature was elevated up to 60° C. and the reaction was further continued (for about 5 hours), until absorption of the isocyanate group at 2250 cm$^{-1}$ in the infrared absorption spectrum disappeared, to obtain urethane acrylate oligomer (having number average molecular weight of 1400). This is called urethane acrylate 1.

RESIN PRODUCING EXAMPLES 2 to 5

504 g of hexamethylene diisocyanate and 8.1 g of 1,3-butanediol were put in the same reactor as that used in Resin Producing Example 1 and reacted for 3 hours at 70° C. for urethanation. Then, the reaction liquid temperature was lowered to 50° C., and 0.5 g of 70% 2-ethylhexanol solution of trimerization catalyst Dabco TMR (trade name by Air Product Co.) was added and reacted at 50° C. for 4 hours, whereupon the isocyanate content in the reaction liquid was 39.7%. The reaction was terminated by adding 0.4 g of 10% ethyl acetate solution of phosphate ester AP-1 (trade name by Daihachi Chemical Co.) as a reaction terminator to the reaction liquid.

Next, the reaction liquid was subjected to thin film distillation so as to remove the non-reacted hexamethylene diisocyanate therefrom. Thus, urethane prepolymer (isocyanurate-modified hexamethylene diisocyanate) having a hexamethylene diisocyanate monomer content of 0.5% by weight or less and an isocyanate content of 21.0% under the condition of 160° C. and a vacuum degree of 0.6 to 0.8 mmHg was obtained.

Next, 0.1 g of urethanation catalyst dibutyl tin dilaurate and 0.1 g of polymerization inhibitor hydroquinone monomethyl ether were added to 200 g of the isocyanurate-modified hexamethylene diisocyanate, and 1.2 mols of the hydroxyalkyl acrylate as shown in Table 2 below was dropwise added thereto over a period of 30 minutes with the reaction liquid temperature being kept at 40° C. After addition, the reaction liquid temperature was elevated up to 60° C., and the reaction was continued until the isocyanate group in the reaction liquid disappeared to obtain urethane acrylate 2 through urethane acrylate 5 as shown in Table 1.

TABLE 1

| Resin Producing Example | Kind of Hydroxyalkyl Acrylate | Number Average Molecular Weight |
|---|---|---|
| Urethane Acrylate 2 | 4-Hydroxybutyl Acrylate (4-HBA) | 960 |
| Urethane Acrylate 3 | 2-Hydroxyethyl Acrylate (2-HEA) | 880 |
| Urethane Acrylate 4 | 2-Hydroxypropyl Acrylate (2-HPA) | 920 |
| Urethane Acrylate 5 | 2-Hydroxy-3-phenyloxypropyl Acrylate | 1200 |

EXAMPLE 1, COMPARATIVE EXAMPLES 1 TO 4

The urethane acrylate oligomers as obtained in the previous Resin Producing Examples were tested to determine the viscosity, ultraviolet hardenability, gel content in the hardened product therefrom and physical properties of the film therefrom, in accordance with the methods mentioned below. The results obtained are shown in Table 2 and Table 3 below.

(1) Viscosity:

The viscosity of each sample was measured with E Model Rotary Viscometer (manufactured by Tokyo Keiki KK) at 25° C.

(2) Ultraviolet Hardenability (UV Hardenability):

① Preparation of Coating Composition:

25 parts of methyl ethyl ketone, 3 parts of benzophenone and one part of 2-hydroxy-2-methyl-1-phenylpropan-1-one were added to 100 parts of each of the produced urethane acrylate oligomers and mixed under heat at 60° C. to prepare coating compositions.

② Hardening Condition:

Each coating composition sample was coated on a glass plate with a 6-mill applicator and dried at 80° C. for 2 minutes, to which ultraviolet rays were irradiated. Irradiation of ultraviolet rays was effected with a 80 W/cm high pressure mercury lamp with a determined distance between the lamp and the coated sample of being 15 cm, and the irradiation time was settled by controlling the speed of the conveyer having the coated sample thereon.

③ Evaluation of Hardenability:

For evaluating the hardenability of the coated sample, the hardened film was rubbed with an acetone-infiltrated gauze ten times by back-and-forth motion whereupon the condition of the outward appearance of the rubbed film was visually observed. From the number of seconds of ultraviolet irradiation needed by the coated film not varying by the rubbing test was counted, which indicates the hardenability of the sample.

(3) Gel Content:

About one g of the coated film as hardened by ultraviolet irradiation was dipped in tetrahydrofuran solvent at room temperature for 48 hours, and the gel content in the film was measured from the weights of the film before and after dipping.

(4) Tensile Strength of Hardened Film (physical property of film):

① Filming Condition:

Each coating composition sample was coated on a glass plate with a 6-mill applicator and was exposed to ultraviolet rays. Then, the coated sample was heat-treated at 80° C. for 30 minutes and then this was stored under the condition of a temperature of 20° C. and a humidity of 60% for 24 hours or more. Then, the physical properties of the stored sample were measured.

② Condition for Ultraviolet Irradiation:

Using a 80 W/cm high pressure mercury lamp, each sample was irradiated with ultraviolet rays for 3.5 seconds, the distance between the lamp and the sample being 15 cm.

③ Condition for Measuring Tensile Strength:

Shape of sample: strip having a width of 10 mm and a thickness of 50 to 60 μm.

Stretching Speed: 5 mm/min for hard type.

Modulus of tensile elasticity, breaking elongation and breaking strength of each coated sample were measured in accordance with JIS-K-7113.

TABLE 2

|  | Comparative Example 1 |
|---|---|
| Kind of Urethane Acrylate | Resin Producing Example 1 |
| Viscosity of Urethane Acrylate (poise) | 770 |
| UV Hardenability (seconds) | 1.5 |
| Gel Content (%) 0.5 sec | 91.2 |
| (UV irradiation, seconds) 2.0 sec | 98.1 |
| Physical Properties of Film |  |
| M10(*) kg/cm² | 11 |
| M50(*) kg/cm² | 49 |
| Breaking Strength kg/cm² | 220 |
| Breaking Elongation % | 85 |

(*)M10: modulus of elasticity of 10%-stretched sample
M50: modulus of elasticity of 50%-stretched sample

TABLE 3

|  | Example 1 | Comparative Example 2 | Comparative Example 3 | Comparative Example 4 |
|---|---|---|---|---|
| Kind of Urethane Acrylate | Resin Producing Example 2 | Resin Producing Example 3 | Resin Producing Example 4 | Resin Producing Example 5 |
| Viscosity of Urethane Acrylate (poise) | 325 | 898 | 2080 | 7170 (35° C.) |
| UV Hardenability (seconds) | 1.0 | 2.0 | 1.5 | 2.5 |
| Gel Content (%) 1.0 second UV irradiation | 98.2 | 91.2 | 93.1 | 92.7 |
| Physical Properties of Film |  |  |  |  |
| M2(*) kg/cm² | 74 | 130 | 200 | 280 |
| M6(*) kg/cm² | 150 | 250 | 280 | 450 |
| Breaking Strength kg/cm² | 260 | 260 | 270 | 450 |
| Breaking Elongation % | 20.5 | 13.0 | 14.0 | 6.0 |

(*) M2: modulus of elasticity of 2%-stretched sample
M6: modulus of elasticity of 6%-stretched sample

EXAMPLE 2, COMPARATIVE EXAMPLES 5 AND 6

(1) Preparation of Coating Composition:

3 parts of photo-polymerization initiator benzophenone and one part of 2-hydroxy-2-methylphenylpropan-1-one were added to 100 parts of the urethane acrylate oligomer as indicated in Table 4 and mixed under heat at 60° C., to prepare coating composition samples with addition of neither solvent nor reactive diluting agent thereto.

(2) Filming Condition:

Each coating composition sample prepared above was heated at 60° C. and coated on a PET film with bar coater (#28) in an area of 15 cm wide and 20 cm long, and the coated condition of the sample was visually observed with the naked eye. Then, ultraviolet rays were irradiated thereto to harden the coat, and the thickness distribution of the hardened coat was measured with an electromagnetic film thickness gauge. The results obtained are shown in Table 4 below.

TABLE 4

|  | Example 2 | Comparative Example 5 | Comparative Example 6 |
|---|---|---|---|
| Kind of Urethane Acrylate (hydroxyalkyl acrylate) | Resin Producing Example 2 (4-HBA) | Resin Producing Example 3 (2-HEA) | Resin Producing Example 4 (2-HPA) |
| Viscosity |  |  |  |
| 25° C. | 325 | 898 | 2080 |
| 60° C. | 7 | 15 | 35 |
| Coated Condition of Non-hardened Coat | good | streaky surface (About 3 minute setting was needed.) | streaky surface (About 3 minute setting was needed.) |
| Thickness Distribution (μm) of Hardened Coat | 28 to 32 | 20 to 40 | 15 to 60 |

From the results in Table 4 above, it is understood that, since the urethane acrylate oligomer prepared from 4-HBA had a low viscosity, it formed a good coat having a narrow thickness distribution with addition of neither solvent no reactive diluting agent thereto.

Where coating compositions have a high viscosity are produced industrially and they are coated on a base, they often involve various problems of unevenness of the thickness of the coated layer and streaky surface of the same and additionally they further involve other problems that control of the thickness of the coated layer is difficult and that high-speed coating with them is impossible. The urethane acrylate oligomer of the present invention is free from these problems, as having a low viscosity.

Addition of solvents and reactive diluting agents (monomers) to coating compositions having a high viscosity would be employable so as to lower the viscosity of the resulting compositions. However, addition of solvents to them is unfavorable in view of the current situation of desiring to save natural resources and energy and to prevent environmental pollution.

Addition of reactive diluting agents involves problems of stimulating the skin of operators and of worsening the physical properties of the coated layers, since the agents have a low molecular weight and are highly volatile. Therefore, the amount of them to be added is desired to be minimized.

Resin Producing Examples 6 to 9

504 g of hexamethylene diisocyanate and 8.1 g of 1,3-butanediol were put in a four-neck flask equipped with a thermometer, a stirrer, a dropping funnel and a drier-combined condenser and reacted for 3 hours at 70° C. for urethanation. The reaction liquid temperature was then lowered to 50° C., and 0.5 g of 70% 2-ethylhexanol solution of trimerization catalyst Dabco TMR (trade name by Air Product Co.) was added to further continue the reaction for 4 hours at 50° C., whereupon the isocyanate content in the reaction liquid was 39.7%. The reaction was terminated by adding 0.4 g of 10% ethyl acetate solution of reaction terminator phosphate AP-1 (trade name by Daihachi Chemical Co.) to the reaction liquid.

Next, the reaction liquid was subjected to thin film distillation so as to remove the non-reacted hexamethylene diisocyanate therefrom. Thus, isocyanurate-modified hexamethylene diisocyanate having a hexamethylene diisocyanate monomer content of 0.5% by weight or less and an isocyanate content of 21.0% under the condition of 160° C. and a vacuum degree of 0.6 to 0.8 mmHg was obtained.

Next, 0.1 g of urethanation catalyst dibutyl tin dilaurate and 0.1 g of polymerization inhibitor hydroquinone monomethyl ether were added to 200 g of the isocyanurate-modified hexamethylene diisocyanate, and 1.2 mols of the hydroxyalkyl acrylate as shown in Table 5 below was dropwise added thereto over a period of 30 minutes with the reaction liquid temperature being kept at 40° C. After addition, the reaction liquid temperature was elevated up to 60° C., and the reaction was continued until the isocyanate group in the reaction liquid disappeared to obtain urethane acrylate oligomer 6 through urethane acrylate oligomer 9 as shown in Table 5.

TABLE 5

| Hydroxyalkyl Acrylate | Urethane Acrylate 6 | Urethane Acrylate 7 | Urethane Acrylate 8 | Urethane Acrylate 9 |
|---|---|---|---|---|
| 4-Hydroxybutyl Acrylate (4-HBA) | 0.6 mol | 0.5 mol | — | — |
| 2-Hydroxyethyl Acrylate (2-HEA) | 0.6 mol | — | — | — |
| 4-Hydroxybutyl Methacrylate (4-HBMA) | — | — | 1.2 mol | — |
| FA-1(*) | — | 0.7 mol | — | 1.2 mol |

(*) FA-1: Placcel ® FA-1 (produced by Daicel Chemical Co.), lactone-modified hydroxyethyl acrylate having one acryl double bond and one hydroxyl group and having a mean molecular weight of 230.

EXAMPLES 3 TO 6, COMPARATIVE EXAMPLES 7 TO 9

(1) Preparation of Coating Composition:

3 parts of photo-polymerization initiator benzophenone and one part of hydroxy-2-methyl-phenylpropan-1-one were added to 100 parts of the urethane acrylate as shown in Table 7 below and mixed under heat at 60° C. to prepare coating composition samples with addition of neither solvent nor reactive diluting agent thereto.

(2) Filming Condition:

Coated samples for evaluating the outward appearance of the coat formed were prepared. Each coating composition sample prepared above was heated at 60° C. and coated on a PET film with a bar coater (#28) in an area of 15 cm wide and 20 cm long, and the coated condition of the sample was visually observed with the naked eye. Then, ultraviolet rays were irradiated thereto to harden the coat, and the thickness distribution of the hardened coat was measured in the same manner as in Example 2.

(3) Filming Condition:

Coated samples for measuring the physical properties of the hardened coat thereon were prepared. Each coating composition sample prepared above was coated on a glass plate with a 6-mill applicator, dried for 2 minutes at 80° C. with a hot air and exposed to ultraviolet rays. Ultraviolet irradiation was effected with a 80 W/cm high-pressure mercury lamp for 3.5 minutes, with the distance between the coat and the lamp of being 15 cm.

(4) Condition for Measuring Tensile Strength:

Shape of sample: strip having a width of 10 mm and a thickness of 50 to 60 μm.

Stretching Speed: 5 mm/min.

Physical properties of each sample were measured in the same manner as in Example 1. The results obtained are shown in Table 6 below.

While the invention has been described in detail and with reference to specific embodiments thereof, it will be apparent to one skilled in the art that various changes and modifications can be made therein without departing from the spirit and scope thereof.

What is claimed is:

1. An ultraviolet-hardening urethane acrylate oligomer obtained by reacting
   a) an isocyanate group-containing urethane prepolymer, and
   b) a hydroxyl group-containing acrylate and/or (meth) acrylate,
   wherein component a) contains isocyanurate rings and component b) contains 40 mol % or more of 4-hydroxylbutyl acrylate and/or 4-hydroxybutyl methacrylate, based on the total amount of component b).

2. The ultraviolet-hardening urethane acrylate oligomer as claimed in claimed in claim 1, which has a vis-

TABLE 6

| | Example 3 | Example 4 | Example 5 | Example 6 | Comparative Example 7 | Comparative Example 8 | Comparative Example 9 |
| --- | --- | --- | --- | --- | --- | --- | --- |
| Kind of Urethane Acrylate (hydroxyalkyl acrylate(s), molar ratio) | Resin Producing Example 2 (4-HBA) | Resin Producing Example 6 (4-HBA/2-HBA = 1/1) | Resin Producing Example 7 (4-HBA/FA = 2/3) | Resin Producing Example 8 (4-HBMA) | Resin Producing Example 3 (2-HEA) | Resin Producing Example 4 (2-HPA) | Resin Producing Example 9 (FA-1) |
| Viscosity (poise) | | | | | | | |
| 25° C. | 325 | 580 | 310 | 310 | 898 | 2080 | 300 |
| 60° C. | 7 | 11 | 7 | 7 | 15 | 35 | 7 |
| Coated Condition of Non-hardened Coat | good | good | good | good | streaky surface (About 3 minute setting was needed.) | streaky surface (About 3 minute setting was needed.) | good |
| Thickness Distribution (μm) of Hardened Coat | 28 to 32 | 26 to 34 | 28 to 32 | 28 to 32 | 20 to 40 | 15 to 60 | 28 to 32 |
| UV Hardenability (seconds) | 1.0 | 1.5 | 1.0 | 2.5 | 2.0 | 1.5 | 1.5 |
| Gel Content (%) (1.0 second UV irradiation) | 98.2 | 95.0 | 96.4 | 95.1 | 91.2 | 93.1 | 94.5 |
| Physical Properties of Film | | | | | | | |
| M2(*) kg/cm$^2$ | 74 | 101 | 52 | 85 | 130 | 200 | 10 |
| M6(*) kg/cm$^2$ | 150 | 200 | 120 | 170 | 250 | 280 | 30 |
| Breaking Strength kg/cm$^2$ | 260 | 260 | 220 | 270 | 260 | 270 | 170 |
| Breaking Elongation (%) | 20.5 | 17.0 | 27.0 | 19.0 | 13.0 | 14.0 | 35.0 |

As is understood from the results in the previous examples and comparative examples, the urethane acrylate oligomers prepared from 4-hydroxybutyl (meth)acrylate each have a low viscosity and excellent coatability and are well hardened with ultraviolet rays. In addition, since the coated films from them each have a high gel content and have suitable flexibility, they are highly elongatable and stretchable and have a high mechanical strength.

Other urethane acrylate oligomers to be prepared from other hydroxyalkyl acrylates, such as Placcel FA-1 (lactone-modified hydroxyethyl acrylate), than those from 4-hydroxybutyl (meth)acrylate may also have a low viscosity. However, as is noted form the results of Comparative Example 10, although such urethane acrylate oligomers of the former have a low viscosity and have good coatability, they form coated films having a low modulus of elasticity and a low breaking strength.

cosity of 600 poise or less at a temperature of 25° C.

3. The ultraviolet-hardening urethane acrylate oligomer as claimed in claim 1, which has a number average molecular weight of from 500 to 10000.

4. The ultraviolet-hardening urethane acrylate oligomer as claimed in claim 1, in which the isocyanurate ring-having urethane prepolymer is one to be obtained by reacting an organic diisocyanate and a polyol in a ratio of from 5/0 to 5/1 by equivalent in the presence of a trimerization catalyst.

5. A coating composition consisting essentially of an ultraviolet-hardening urethane acrylate oligomer as claimed in claim 1 and a photo-polymerization initiator.

6. The ultraviolet-hardening urethane acrylate oligomer as claimed in claim 1, in which the proportion of 4-hydroxybutyl acrylate or 4-hydroxybutyl methacrylate is 50 mol % or more of the whole of hydroxy group-containing acrylates and/or methacrylates.

* * * * *